US005373986A

United States Patent [19]

Rafferty et al.

[11] Patent Number: 5,373,986

[45] Date of Patent: Dec. 20, 1994

[54] FLUORIDE CLEANING OF METAL SURFACES AND PRODUCT

[76] Inventors: Kevin Rafferty, 193 Countryview Dr., Harrison, Ohio 45030; Bruce Rowe, 3043 Wold Ave., Cincinnati, Ohio 45206

[21] Appl. No.: 970,683

[22] Filed: Nov. 4, 1992

[51] Int. Cl.[5] .......................... B08B 5/00; B23K 31/02

[52] U.S. Cl. .................................... 228/206; 228/119; 228/220; 134/7; 134/31; 148/120; 148/121; 148/122; 148/243; 148/251; 148/254; 148/255; 148/258; 148/259; 427/142; 427/248.1; 427/252; 427/253

[58] Field of Search ...................... 427/142, 248.1, 252, 427/253, 407.1, 118, 126.1; 156/327, 94 F, 155, 272 Z; 148/120, 121, 122, 243, 251, 254–255, 268, 289

[56] References Cited

U.S. PATENT DOCUMENTS

| | | | |
|---|---|---|---|
| 3,743,556 | 7/1973 | Breton et al. | 156/62.8 |
| 3,778,586 | 12/1973 | Breton et al. | 219/76 |
| 3,876,447 | 4/1975 | Lally | 117/22 |
| 3,917,149 | 11/1975 | Breton et al. | 228/124 |
| 3,997,447 | 12/1976 | Breton et al. | 210/360 |
| 4,016,345 | 4/1977 | Holmes | 526/206 |
| 4,042,747 | 8/1977 | Breton et al. | 428/323 |
| 4,325,754 | 4/1982 | Mizuhara et al. | 148/22 |
| 4,477,527 | 10/1984 | Grosner | 428/401 |
| 4,563,329 | 1/1986 | Morishita et al. | 419/9 |
| 4,596,746 | 6/1986 | Morishita et al. | 428/458 |
| 4,965,095 | 10/1990 | Baldi | 427/142 |

*Primary Examiner*—Richard P. Weisberger

[57] ABSTRACT

A method of cleaning a metal surface includes covering the portion of the metal surface with a cleaning tape. The cleaning tape is chromium in combination with a fluoride ion source bound together by fibrillated polytetrafluoroethylene. This is applied to the portion of the area to be cleaned and is subject to heat treatment at about 1800° F. and a reducing atmosphere of preferably hydrogen. This effectively cleans only the area covered by the tape. Further, the tape and binder format acts to force fluoride ions into the cracks on the surface providing a significantly improved cleaning operation.

7 Claims, No Drawings

FLUORIDE CLEANING OF METAL SURFACES AND PRODUCT

BACKGROUND OF THE INVENTION

The parts of a jet engine are primarily formed from superalloys which when used in the high temperature areas of an engine have a hard protective exterior coating to prevent oxidation of these parts. In the manufacture and subsequent operation of jet engines, microcracks can form in the engine parts. Oxides including aluminum oxide, chromium oxide, and titanium dioxide form on the untreated surfaces of these cracks. These oxides are normally not reducible in a standard vacuum or hydrogen thermal cycle and prevent repair of the surface since they prevent deposition of surface treatment compositions.

There are three primary methods currently used to remove the contaminant oxides. One method is a two-step reaction involving elemental chrome and ammonium fluoride heated in the presence of hydrogen to generate hydrogen fluoride gas. This generally requires treatment of the entire product. The second method uses the thermal decomposition of polytetrafluoroethylene in the presence of dry hydrogen to produce hydrogen fluoride gas. The third method is hydrogen fluoride gas treatment itself introduced to the cleaning retort.

The treatment of the entire surface with hydrogen fluoride gas is effective but requires treatment of the entire article which then must receive post-treatment, if previously coated. This is very costly. Localized treatment of the crack area is definitely preferred if accomplished effectively.

SUMMARY OF THE INVENTION

The present invention is premised on the realization that an isolated portion of a metal surface can be cleaned by using, as a cleaning agent, a cleaning tape formed from fibrillated polytetrafluoroethylene (PTFE), a chromium compound and a fluoride source such as ammonium fluoride.

The present invention is further premised on the realization that when such a tape is placed over a crack in the surface of a jet engine part, the tape directs the in situ generated fluoride into the crack causing the generated fluoride to reduce the oxide formed on the crack surface and effectively prepare it for subsequent treatment and repair.

The objects and advantages of the present invention will be further appreciated in light of the following detailed description.

DETAILED DESCRIPTION

The present invention is designed to clean localized portions of metal surfaces by applying a cleaning tape onto the metal surface and heating the cleaning tape to activate it and thereby clean the surface of the metal. This is particularly useful in the aerospace industry to clean high temperature alloys of nickel, titanium, cobalt and tungsten such as Rene 35, Rene 41, Rene 77, Rene 80, Rene 80H, Rene 95, Rene 125, Rene 142, Inconel 713, Inconel 718, Hastelloy X, Wasp alloy, Haynes 188, L605, X-40, and Mar M-509.

The cleaning tape itself includes three components: a polytetrafluoroethylene (PTFE) binder, a chromium compound, and an inorganic fluoride ion generating compound. The polytetrafluoroethylene (PTFE) is specifically a fibrillated polytetrafluoroethylene. Fibrillated PTFE polymer used in the present invention is a high molecular weight PTFE resin produced by emulsion polymerization. These PTFE polymers have a broad molecular weight range of 10–20 million and are commercially available products.

Preparation of these polymers which is described in U.S. Pat. No. 2,510,112, U.S. Pat. No. 2,587,357, and U.S. Pat. No. 2,685,707 involves well known emulsion polymerization techniques wherein the tetrafluoroethylene under pressure in water containing an emulsifying agent is reacted with a water soluble free radical catalyst. The emulsion produced is coagulated, washed, and dried.

The average particle size of the polymer is 50–560 microns although polymers having larger or smaller particle size will function in the present invention. The PTFE used in the present invention is a fibrillater polytetrafluoroethylene sold by E.I. DuPont of Wilmington, Del. under the trade designation Teflon® 6C. The present invention will include sufficient PTFE to bind the chromium powder and the fluoride source. Typically, from about 2 to about 15% by weight PTFE will be employed and preferably about 4–10% with 6% preferred.

In addition to the binder, the present invention includes a chromium compound such as elemental chromium or chromium fluoride. Generally, this must be present in an amount from about 30 to about 50% by weight and preferably about 47%. Generally, the particle size of the chromium compound will be about 325 mesh or smaller.

The third component of the present invention is a source of fluoride ions. The source of fluoride ions will be an inorganic fluoride containing composition which upon heating to a temperature of about 1800° F. will decompose to form and release fluoride ions in the presence of the chromium powder. Generally, the fluoride ion source will be ammonium fluoride. Ammonium fluoride is preferred. Generally the present invention will include from 30–50% fluoride ion source and preferably about 47% ammonium fluoride by weight.

To formulate the tape for use in the present invention, the individual components are measured and combined in a ball mill or other low shear mixtures such as a KD miller with kinetic dispersion or vibratory mixer. Due to the corrosive nature of the components, the mixing vessel should be stainless steel or a similar nonreactive material. In a ball mill, the mixer is run at about 200 rpm with stainless steel balls. This is continued until the mixture changes from a powder to small agglomerated particles, generally, about 20 to 40 minutes.

The mixture is then separated from the steel balls and rolled between adjustable rollers to a thickness of 0.001 to about 0.5 inches with 0.1 preferred. Specifically, the mixture is rolled between pressure rollers in a first direction and then the formed sheet is folded in half and this folded sheet is again rolled in a direction 90° from the axis of the first, rolling, i.e., cross rolled.

Each rolling step decreases the thickness of the sheet. If desired, the rollers can be heated to a temperature of 20° to 200° C. although this is not necessary. Preferably, during the rolling operation, the sheet is separated from the rollers by aluminum foil separating sheets or other suitable materials. This rolling is continued until the desired thickness and consistency of the material is obtained.

The formed tape is cut to the desired size and pressed against the metal surface at the site of the crack and causes it to adhere to the metal surface. A suitable adhesive such as Nicrobraze 200 may be used to hold the tape in position. Generally, the metal surface will be a stainless steel, nickel superalloy such as Rene 77 or Cobalt superalloy such as Mar M509. The object being cleaned is then heated to a temperature of about 1800° F. for 0.5 to about 4 hours with about 2 hours being preferred.

The heating step is conducted either in a reducing atmosphere or in a vacuum. Hydrogen is the preferred reducing atmosphere. The heating step completes the removal of the oxide and leaves only a slight residue which is chromium bifluoride, chrome and traces of ammonium fluoride which is brushed away. This cleaned area can then be subsequently repaired and coated by applying a coating composition only to the area which was cleaned. This in effect extends the useful life of the part being treated since the entire part is not subjected to the harsh treatment of hydrofluoric acid.

Further, the localized treatment is, of course, significantly less expensive. Further, it is environmentally advantageous since only a minor amount of hydrofluoride is generated in this process as opposed to a process which requires subjecting the entire part to a hydrogen fluoride atmosphere. Thus, the present invention is both economically and environmentally preferred. At the same time, it provides the same efficacy of much more harsh cleaning processes.

EXAMPLE

A low pressure turbine vane segment made from Rene 77 requires base metal repair on the leading edge of a vane which has ben damaged and is heavily oxidized from engine run conditions. It is not damaged anywhere else and is not nickel aluminide coated. The first step in the repair process would be to fluoride ion clean the part or repair area. Use of the present invention allows the cleaning of the repair area only. A piece of fluoride ion treatment tape formed from 47/% $NH_4F$ and 47% chromium and 6 PTFE is applied to the repair area and the part is subsequently processed through a furnace cycle at 1800 ° F. for two hours in dry hydrogen. The part is now ready for the base metal repair.

The preceding has been a description of the present invention along with the description of the preferred embodiment of the present invention. However, the invention itself should only be defined by the appended claims.

We claim:

1. A method of cleaning a metal surface comprising positioning a tape over a first portion of said surface and leaving a second portion of said metal surface uncovered by said tape, said tape comprising a chromium compound, an inorganic fluoride source bound together by fibrillated polytetrafluoroethylene;

heating said surface to a temperature effective to cause said polytetrafluoroethylene to evaporate whereby fluoride ions are liberated from said fluoride source and act to clean said first portion of said surface.

2. The method claimed in claim 1 wherein said tape comprises 2–15% of said polytetrafluoroethylene.

3. The method claimed in claim 1 wherein said fluoride source is ammonium fluoride.

4. The method claimed in claim 1 wherein said heating is conducted in a vacuum.

5. The method claimed in claim 1 wherein said heating is conducted in a hydrogen atmosphere.

6. The method claimed in claim 3 wherein said fluoride source is ammonium fluoride.

7. The method claimed in claim 1 wherein said temperature is at least about 1800° F.

* * * * *